Sept. 1, 1953 — H. BARNETT — 2,650,604
MIXING VALVE
Filed Aug. 13, 1947
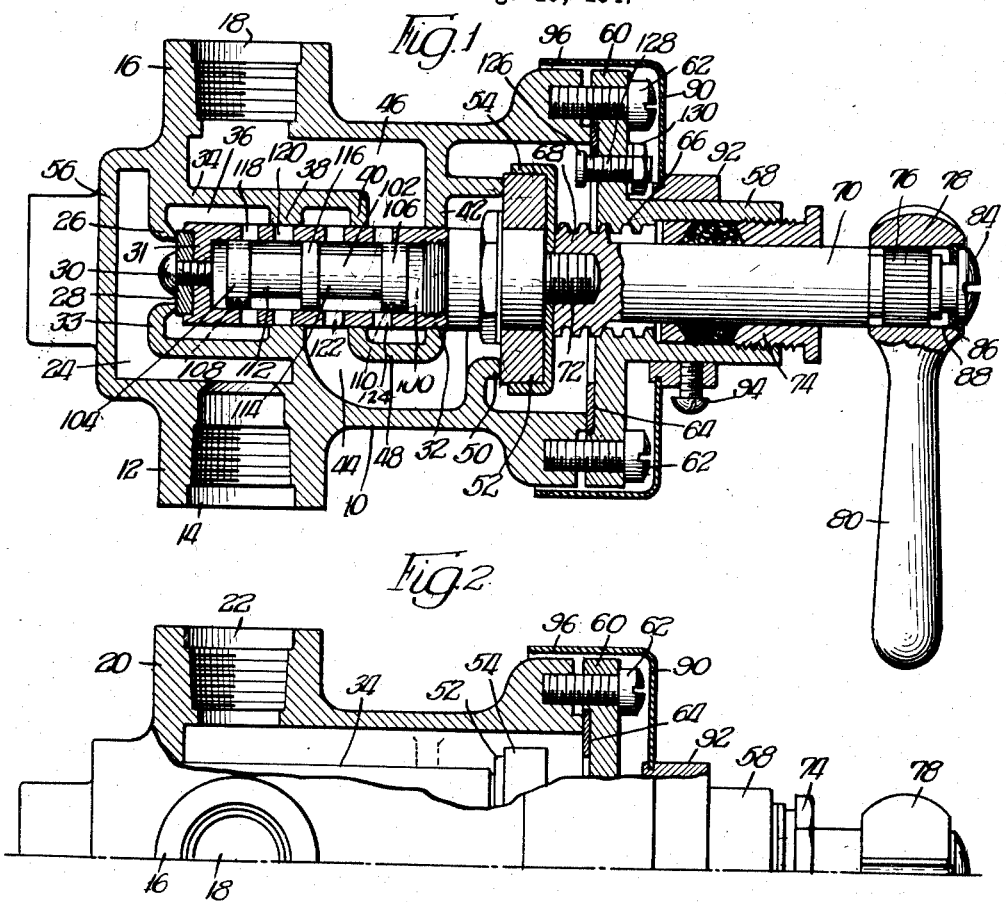
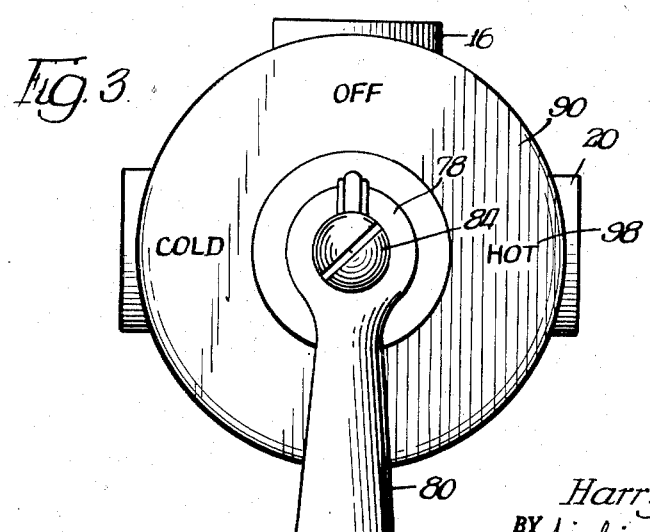
INVENTOR.
Harry Barnett, Patented Sept. 1, 1953

2,650,604

UNITED STATES PATENT OFFICE 2,650,604

MIXING VALVE

Harry Barnett, Glencoe, Ill., assignor to The Powers Regulator Company, Chicago, Ill., a corporation of Illinois Application August 13, 1947, Serial No. 768,291

5 Claims. (Cl. 187—100)

This invention pertains to mixing valves.

It is an object of this invention to provide a mixing valve so constructed and arranged that when the valve is in "Off" position there is no fluid pressure on the packing gland of the valve.

Another object of the invention is to provide a mixing valve construction wherein the maximum delivery temperature of the mixed fluids is controlled.

Another object of the invention is to provide a mixing valve construction wherein outlet of the mixed fluids is positively controlled.

Another object of the invention is to provide a mixing valve so constructed and arranged that the valve is adapted to deliver mixed fluids at substantially constant temperatures regardless of variations in pressures of the unmixed fluids supplied to said valve.

Another object of the invention is to provide a mixing valve construction for mixing hot and cold fluids to deliver the mixed fluids at a selected temperature, failure of the supply of cold fluids resulting in the valve becoming inoperative to deliver any fluid.

Another object of the invention is to provide a mixing valve construction for mixing hot and cold fluids to deliver the mixed fluids at a selected temperature, failure of the supply of one of the fluids resulting in the valve becoming inoperative to deliver any fluid.

Another object of the invention is to provide a mixing valve construction for mixing hot and cold fluids to deliver the mixed fluids at a selected temperature, an equalizing valve being provided to maintain the delivery of the mixed fluids at the selected temperature regardless of variations in pressures of the hot and cold fluids supplied to the valve.

With these and various other objects in view, the invention consists of certain novel features of constructon and operation as will be more fully described and particularly pointed out in the specification, drawings and claims appended hereto.

In the drawings which illustrate embodiments of the device and wherein like reference characters are used to designate like parts—

Figure 1 is a sectional elevation of a mixing valve embodying the invention;

Figure 2 is a fragmentary sectional elevation of the valve illustrated in Figure 1, taken at substantially 90° thereto, and looking downwardly of Figure 1; and Figure 3 is a fragmentary end elevation of the valve illustrated in Figures 1 and 2, the same looking toward the left as viewed in Figure 1.

The valve comprises the body 10 provided with the threaded boss 12 adapted to be connected to a hot water supply for supplying hot water to the inlet 14 of the body 10. The body is also provided with the threaded boss 16 adapted to be connected to a suitable cold water supply whereby cold water is supplied to the cold water inlet 18. The body additionally is provided with the threaded boss 20 adapted to be connected to suitable dispensing means whereby the mixed hot and cold water is supplied through the outlet 22 of the body.

Hot water inlet 14 communicates with the passage 24 which in turn communicates with the circular valve seat 26 adapted to be closed by the valve disk 28 secured as at 30 to closed end 31 of the hollow main valve member 32. The valve seat 26 is conveniently provided on the end wall 33 of inner valve casing 34 integral with the casing 10 and provided with the hot water passage 36 adjacent to seat 26. The valve member 32 is slidably disposed in the spaced bearings or guides 38, 40 and 42 preferably integral with the casings 34 and 10. Casings 34 and 10 are shaped to provide the chamber 44 spaced from the passage 36 by the guide 38, the chamber 44 forming a mixing chamber.

Cold water inlet 18 communicates with the pasage 46 separated from mixing chamber 44 by the casing 34 and web 48. Casing 10 and web 48 are provided with the valve seat 50 adapted to be closed by the valve disk 52 secured to the valve member 32, being provided with a suitable cup 54. The end of the housing 10 adjacent the valve seat 26 is closed as at 56, the opposite end, that is, the end adjacent the seat 50 being closed by means of the end fitting or closure plate 58 provided with the outwardly directed flange 60, secured as at 62 to the housing 10, a suitable washer 64 being interposed between the flange 60 and the casing 10.

The fitting 58 is provided with threads 66 adapted to cooperate with threads 68 provided on the stem 70, the stem 70 being secured as at 72 to the valve disk 52 and valve member 32. Rotation of the stem 70, therefore, causes axial movement of said stem 70. The stem 70 extends through a suitable non-leaking stuffing box or gland 74 and the end of the stem is provided with the knurled portion 76 adapted to be received within the hub 78 of handle 80, being a force fit therein whereby relative rotation between the handle 80 and the stem 70 is prevented. The handle is secured to the stem by means of the screw 84 which is suitably threaded into corresponding threads of the end of the stem 70, forcing the disk or washer 86 against the shoulder 88 provided in the hub 78.

Housing 90 provided with a hub 92 is secured as at 94 to the fitting 58 and has a flange 96 embracing flange 60 and the adjacent portion of casing 10, and said housing 90 is provided with the indicia 98 indicating the "Hot," "Cold" and "Off" positions of the handle 80, and consequently valves 52 and 28.

Valve member 32 is provided with the bore 100 in which the equalizing valve 102 is slidably disposed. Said equalizing valve consists essentially of end disks 104 and 106 provided with peripheral passages 108 and 110, the valve being shorter than the bore. The members 104 and 106 are provided with stems 112 and 114 connecting said disks to the center disk 116. The valve member 32 is provided with spaced peripheral inlet and outlet apertures 118 and 120 adapted to have communication with each other between disks 104 and 116, and said valve 32 is provided with the spaced peripheral inlet and outlet apertures 122 and 124 adapted to be connected to each other between 106 and 116. Apertures 120 and 122 are preferably larger than apertures 118 and 124, respectively.

In order to prevent the valves 28 and 52 from being opened too great a distance, that is, in order to provide a maximum temperature adjustment, the flange 60 is provided with the adjustable stop 126 adjusted by means of the thread 128 and secured in adjusted position by means of the nuts 130.

In the operation of this form of valve, when the handle is in the "Off" position, both valves 52 and 28 are closed, and in this position there is thus no pressure on the stuffing box 74. When it is desired just to dispense cold water, the valve is moved to a position indicated as "Cold," wherein port 120 is not connected to the mixing chamber 44, so that only cold water can enter the inlet 18 and flow through passage 46, and ports 124 and 122 to the mixing chamber 44, and thence past valve 52 to the outlet 22.

When it is desired to mix hot and cold water, the handle is moved between the "Hot" and "Cold" posiitons wherein not only port 122 is in communication with the mixing chamber 44, but also port 120. Cold water will then enter inlet 18, passage 46 and flow through ports 124 into the bore 100 between the disks 106 and 116, also passing through passages 110 into the space between the end of the bore and the disk 106. Hot water will enter the inlet 14, passage 24 and flow past disk 28 into the passage 36 where it will enter the bore 100 between disks 104 and 116 through ports 118. Hot water will also flow through passages 108, entering bore 100 between the closure 31 and disk 104. Any differential in pressure will cause axial movement of the equalizing valve 102 one way or another so that if there is a sudden drop in cold fluid pressure, the auxiliary valve will move to prevent entrance of additional hot water through the ports 118.

Assuming no extraordinary conditions, the equalizing valve will be moved to permit the hot water to flow to the mixing chamber 44 through ports 120, and the selected amount of cold water will be supplied to the chamber 44 through ports 122. The mixture will then be discharged past valve 52, and outwardly through port 22. Should there be a failure of cold water pressure the hot fluid pressure supplied through ports 118 will cause the auxiliary valve 102 to move to the right as viewed in Figure 1 causing disk 104 to cut off flow through aperture 118, so no scalding fluid can be dispensed. A similar action takes place in the event there is a failure of hot fluid pressure. It may thus be said that the control valves consist of disk 104 and aperture 118 on the hot water side, and disk 106 and aperture 124 on the cold water side. Apertures 120 and 122 serve to control the ratios of hot and cold water mixtures and are controlled manually by means of handle 80.

While the valve has been described as a mixing valve for hot and cold water, it is of course understood that other fluids are contemplated and it is additionally understood that this application is not to be limited by the exact embodiments of the device shown, which are merely by way of illustration and not limitation as various and other forms of the device will, of course, be apparent to those skilled in the art without departing from the spirit of the invention or the scope of the claims.

I claim:

1. In valve mechanism, the combination of a casing having a cold liquid inlet, a hot liquid inlet, and a mixed liquid outlet, a valve housing in said casing and disposed between said inlets and outlet, said casing having an inlet defined by a valve seat, a valve bearing in said casing spaced from said seat whereby a hot liquid passage is defined in said casing, a first wall forming a bearing spaced from said first named bearing, said wall forming bearing being connected to a second wall forming bearing whereby a mixing chamber is formed between said first named bearing and first wall forming bearing, and a cold liquid passage is formed between said first and second wall forming bearings, said last named passage communicating with said cold liquid inlet, said mixing chamber having a valve seat, a closure for said casing adjacent said last named valve seat, a valve stem extending through said closure and mounted for reciprocation with respect thereto, said stem being provided with a valve member adapted to open and close said last named seat for controlling flow from said mixing chamber, the passage between said last named seat and closure communicating with said outlet, a hollow cylindrical valve member fixed to said last named valve member and closed at the end adjacent thereto and slidably mounted in said bearings, the other end of said hollow valve member being provided with a valve disk adapted to close said first named seat when said last named seat is closed, said hollow valve member having first axially spaced ports so disposed that when said valve seats are closed a port will be in communication with the hot liquid passage and the axially spaced port will be in alignment with said valve bearing, the bearing being of such width that the hollow valve member may be moved to connect the hot liquid passage and a mixing chamber through said axially spaced ports, said hollow valve member having second axially spaced ports so disposed that when said valve seats are closed said last named ports communicate with the mixing chamber and cold liquid passage, the last named ports being so spaced that one of the ports may be moved out of communication with the mixing chamber, and a floating compensating valve mounted in said hollow valve member, said compensating valve comprising a disk adjacent each end of the hollow valve member, a disk intermediate said end disks and rigidly connected thereto by stems of smaller diameter than the end disks, the end disks having passages permitting communication with the ends of the hollow member, the disks being so arranged that the spaces between the intermediate disk and the end disks respectively connect the spaced ports of the first and second axial ports, one end disk being responsive to pressure in the hot liquid passage for controlling the port communicating with said hot liquid passage and the other end disk being responsive to pressure in the cold liquid passage for controlling the port communicating with said cold liquid passage.

2. In valve mechanism, the combination of a casing having a cold liquid inlet, a hot liquid inlet, and a mixed liquid outlet, a valve housing in said casing and disposed between said inlets and outlet, said casing having an inlet defined by a valve seat, a valve bearing in said casing spaced from said seat whereby a hot liquid passage is defined in said casing, a first wall forming a bearing spaced from said first named bearing, said wall forming bearing being connected to a second wall forming bearing whereby a mixing chamber is formed between said first named bearing and first wall forming bearing, and a cold liquid passage is formed between said first and second wall forming bearings, said last named passage communicating with said cold liquid inlet, said mixing chamber having a valve seat, a closure for said casing adjacent said last named valve seat, a valve stem extending through said closure and mounted for reciprocation with respect thereto, said stem being provided with a valve member adapted to open and close said last named seat for controlling flow from said mixing chamber, the passage between said last named seat and closure communicating with said outlet, an adjustable member carried by said closure for limiting movement of said valve member from its seat, a hollow cylindrical valve member fixed to said last named valve member and closed at the end adjacent thereto and slidably mounted in said bearings, the other end of said hollow valve member being provided with a valve disk adapted to close said first named seat when said last named seat is closed, said hollow valve member having first axially spaced ports so disposed that when said valve seats are closed a port will be in communication with the hot liquid passage and the axially spaced port will be in alignment with said valve bearing, the bearing being of such width that the hollow valve member may be moved to connect the hot liquid passage and the mixing chamber through said axially spaced ports, said hollow valve member having second axially spaced ports so disposed that when said valve seats are closed said last named ports communicate with the mixing chamber and cold liquid passage, the last named ports being so spaced that one of the ports may be moved out of communication with the mixing chamber, and a floating compensating valve mounted in said hollow valve member, said compensating valve comprising a disk adjacent each end of the hollow valve member, a disk intermediate said disks end and rigidly connected thereto by stems of smaller diameter than the end disks, the end disks having passages permitting communication with the ends of the hollow member, the disks being so arranged that the spaces between the intermediate disk and the end disks respectively connect the spaced ports of the first and second axial ports, one end disk being responsive to pressure in the hot liquid passage for controlling the port communicating with said hot liquid passage and the other end disk being responsive to pressure in the cold liquid passage for controlling the port communicating with said cold liquid passage.

3. In mixing valve mechanism, the combination of a casing having hot and cold liquid inlets and a mixed liquid outlet, said casing having passages communicating with said inlets, respectively, and having a mixing chamber adapted to be supplied with liquid from said passages, a valve seat between said mixing chamber and said outlet, and a valve for said seat adapted to control flow past said seat to said outlet, a second valve seat between said mixing chamber and one of said passages, and a second valve for said second seat for controlling flow from said last named passage to said mixing chamber, a hollow member disposed between said valves and having a plurality of pairs of ports, said second valve being provided on the hollow member, a movable auxiliary valve member disposed in said hollow member, one port of one pair of ports being an inlet port for the hot liquid and one port of the other pair of ports being an inlet for the cold liquid, the other ports of each pair of ports being outlet ports adapted to be moved upon movement of the hollow member to communicate with the mixing chamber when the first named valves are opened, and said auxiliary valve member having spaced disks responsive to pressure conditions prevailing in said passages respectively for controlling the inlet ports of the hollow member.

4. Mixing valve mechanism as defined by claim 3, wherein the spaced discs of the auxiliary valve member comprise a disc at each end of the member, wherein each end disc is apertured to permit liquid to surround said auxiliary valve member, whereby when said first named valves are open and failure of fluid pressure occurs in one of said inlets the auxiliary valve member operates to close one of said inlet ports of the hollow member, and additionally including means for actuating the first named valves to open and close the same in unison, the said means extending axially of the casing and to which the valves are fixed in spaced relation.

5. A mixing valve member as defined by claim 3 additionally including a valve stem extending axially of the casing and mounted for reciprocation, said first named valves being fixed to the stem in fixed relation so that said valves open and close in unison, and wherein the spaced discs of the auxiliary valve member comprises a disc at each end of the member in associated relation with an inlet port in the hollow member.

HARRY BARNETT.

References Cited in the file of this patent
UNITED STATES PATENTS

| Number | Name | Date |
|---|---|---|
| 954,731 | Graham | Apr. 12, 1910 |
| 1,182,287 | McNeil | May 9, 1916 |
| 1,508,938 | Powers | Sept. 16, 1924 |
| 1,706,630 | Newton | Mar. 26, 1929 |
| 2,308,127 | Symmons | June 13, 1941 |